(12) United States Patent
Murphy et al.

(10) Patent No.: US 6,185,695 B1
(45) Date of Patent: Feb. 6, 2001

(54) METHOD AND APPARATUS FOR TRANSPARENT SERVER FAILOVER FOR HIGHLY AVAILABLE OBJECTS

(75) Inventors: Declan J. Murphy, San Francisco; Madhusudhan Talluri, Fremont; Vladimir Matena, Redwood City; Yousef A. Khalidi, Cupertino, all of CA (US); Jose M. Bernabeu-Auban, Valencia (ES); Andrew G. Tucker, Menlo Park, CA (US)

(73) Assignee: Sun Microsystems, Inc., Palo Alto, CA (US)

(*) Notice: Under 35 U.S.C. 154(b), the term of this patent shall be extended for 0 days.

(21) Appl. No.: 09/058,406

(22) Filed: Apr. 9, 1998

(51) Int. Cl.$^7$ ........................................... G06F 11/07
(52) U.S. Cl. .................... 714/4; 714/15; 709/229; 709/226; 709/221
(58) Field of Search ................... 714/1, 2, 3, 4, 714/25, 48, 11, 13, 15, 16, 19, 20, 49; 709/221, 225, 226, 227, 228, 229, 232, 237

(56) References Cited

U.S. PATENT DOCUMENTS

| | | | |
|---|---|---|---|
| 5,157,663 | * 10/1992 | Major et al. | 714/10 |
| 5,566,297 | * 10/1996 | Devarakonda et al. | 714/15 |
| 5,666,479 | * 9/1997 | Kashimoto et al. | 714/2 |
| 5,668,943 | 9/1997 | Attanasio et al. | 395/182.05 |
| 5,682,534 | 10/1997 | Kapor et al. . | |
| 5,737,514 | * 4/1998 | Stiffler | 714/13 |
| 5,796,934 | * 8/1998 | Bhanot et al. | 714/4 |
| 5,819,019 | * 10/1998 | Nelson | 714/4 |
| 5,852,724 | * 12/1998 | Glenn, II et al. | 709/239 |
| 5,907,673 | * 5/1999 | Hirayama et al. | 714/16 |
| 5,958,070 | * 9/1999 | Stiffler | 714/13 |

FOREIGN PATENT DOCUMENTS 0 817 024 A2   12/1997   (EP) .

OTHER PUBLICATIONS

Thomas Becker,"Transparent Service Reconfiguration After Node Failure," Configurable Distributed Systems, pp. 212–223, 1992.*

Chin et al, "Transparency in a Replicated Network File System,"EUROMICRO–96, Beyond 2000: Hardware and Software Desing Strategies; Proceedings of the 22nd EUROMICRO Conference, pp. 285–291, 1995.*

* cited by examiner

*Primary Examiner*—Robert W. Beausoliel, Jr.
*Assistant Examiner*—Christopher Revak
(74) *Attorney, Agent, or Firm*—Park & Vaughan

(57) ABSTRACT

One embodiment of the present invention provides a method and an apparatus that facilitates transparent failovers from a primary copy of an object on a first server to a secondary copy of the object on a second server when the first server fails, or otherwise becomes unresponsive. The method includes detecting the failure of the first server; selecting the second server; and reconfiguring the second server to act as a new primary server for the object. Additionally, the method includes transparently retrying uncompleted invocations to the object to the second server, without requiring explicit retry commands from a client application program. A variation on this embodiment further includes winding up active invocations to the object before reconfiguring the second server to act as the new primary server. This winding up process may include causing invocations to unresponsive nodes to unblock and complete. Another variation includes blocking new invocations to the object after detecting the failure of the first server, and unblocking these new invocations after reconfiguring the second server to act as the new primary server. Hence, the present invention can greatly simplify programming of client application programs for highly available systems. It also makes it possible to use a client application program written for a nonhighly available system in a highly available system.

25 Claims, 8 Drawing Sheets

METHOD AND APPARATUS FOR TRANSPARENT SERVER FAILOVER FOR HIGHLY AVAILABLE OBJECTS

BACKGROUND

1. Field of the Invention

The present invention relates generally to distributed object operating systems, and more particularly to a system and method that supports transparent failover from a primary server to a secondary server during accesses to a remote object.

2. Related Art

As computer networks are increasingly used to link computer systems together, distributed operating systems have been developed to control interactions between computer systems across a computer network. Some distributed operating systems allow client computer systems to access resources on server computer systems. For example, a client computer system may be able to access information contained in a database on a server computer system. When the server fails, it is desirable for the distributed operating system to automatically recover from this failure. Distributed computer systems with distributed operating systems possessing an ability to recover from such server failures are referred to as "highly available systems." Data objects stored on such highly available systems are referred to as "highly available data objects."

For a highly available system to function properly, the highly available system must be able to detect a server failure and to reconfigure itself so accesses to objects on the failed server are redirected to backup copies on other servers. This process of switching over to a backup copy on another server is referred to as a "failover."

Existing client-server systems typically rely on the client application program to explicitly detect and recover from server failures. For example, a client application program typically includes code that explicitly specifies timeout and retry procedures. This additional code makes client application programming more complex and tedious. It also makes client application programs particularly hard to test and debug due to the difficulty in systematically reproducing the myriad of possible asynchronous interactions between client and server computing systems. Furthermore, each client application program must provide such failover code for every access to a highly available object from a server.

Therefore, what is needed is a distributed-object operating system that recovers from server failures in a manner transparent to client application programs. Such a distributed system will allow client application programs to be written without the burden of providing and testing failure detection and retry code.

SUMMARY

One embodiment of the present invention provides a method and an apparatus that facilitates transparent failovers from a primary copy of an object on a first server to a secondary copy of the object on a second server when the first server fails, or otherwise becomes unresponsive. The method includes detecting the failure of the first server; selecting the second server; and reconfiguring the second server to act as a new primary server for the object. Additionally, the method includes transparently retrying uncompleted invocations to the object to the second server, without explicit retry commands from a client application program. A variation on this embodiment further includes winding up active invocations to the object before reconfiguring the second server to act as the new primary server. This winding up process can include causing invocations to unresponsive nodes to unblock and complete. Another variation further includes blocking new invocations to the object after detecting the failure of the first server, and unblocking these new invocations after reconfiguring the second server to act as the new primary server. Hence, the present invention can greatly simplify programming of client application programs for highly available systems. It also makes it possible to use a client application program written for a nonhighly available system in a highly available system.

Still other embodiments of the present invention will become readily apparent to those skilled in the art from the following detailed description, wherein is shown and described only the embodiments for the invention by way of illustration of the best modes contemplated for carrying out the invention. As will be realized, the invention is capable of other and different embodiments and several of its details are capable of modifications in various obvious respects, all without departing from the spirit and scope of the present invention. Accordingly, the drawings and detailed description are to be regarded as illustrative in nature and not as restrictive.

DETAILED DESCRIPTION OF THE INVENTION

Related Applications

This application is related to the following commonly-assigned U.S. patent applications: Ser. No. 08/829,156 to Matena, et al., filed Mar. 31, 1997, pending; Ser. No. 08/884,978 to Murphy, et al., filed Jun. 30, 1997, pending; Ser. No. 08/879,150 to Tucker, et al., filed Jun. 19, 1997, pending; and Ser. No. 08/879,151 to Tucker, et al., filed Jun. 19, 1997, pending; the disclosures of which are incorporated herein by reference for all purposes as set forth in full.

Definitions

Failover—The process of switching from a primary copy of an object on a first server to secondary copy of the object on a second server when the first server fails.

Failure of a Server—a condition that occurs when a server fails to respond to a request from a client in a timely manner.

Object—any data object, or more narrowly an object defined within an object-oriented programming environment.

Replica Manager—a process or mechanism that keep track of the various primary and secondary copies of an object on various servers.

Retrying Transparently—retrying an invocation to an object without explicit retrying by the client application program.

Transparent Failover—A failover that occurs automatically, without explicit failure detection and retry commands from a client application program.

Winding up Invocations to an Object—waiting for any active invocations to the object to complete. This may additionally include tearing down data structures associated with invocations to the object.

Description of Distributed System

Figure 1:
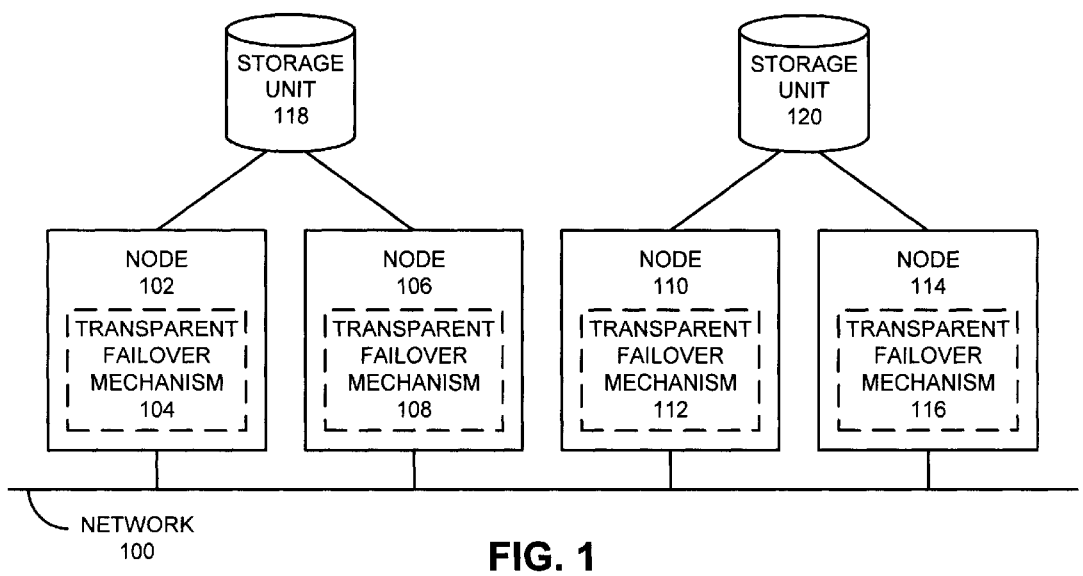
FIG. 1 is a diagram illustrating a distributed computing system including a plurality of nodes 102, 106, 110 and 114, which can functions as either client and/or server systems in accordance with an embodiment of the present invention.

FIG. 1 is a diagram illustrating a distributed computing system including a plurality of nodes 102, 106, 110 and 114, which can function as either client systems and/or server systems in accordance with an embodiment of the present invention. The system illustrated in FIG. 1 includes network 100, which is coupled to nodes 102, 102, 106, 110 and 114. Network 100 generally refers to any type of wire or wireless link between computers, including, but not limited to, a local area network, a wide area network, or a combination of networks. Nodes 102, 106, 110 and 114 use network 100 to communicate with each other. Each of nodes 104, 106, 110 ad 114 represent independent client/server computer systems, wherein each node can function as a client and/or a server computer system. A client computer system is associated with a node that invokes an object. A server computer system is associated with a node that stores the object's methods. In certain cases, the client and server for an object exist on the same node. In other cases, the client and server will exist on distinct nodes.

FIG. 1 includes storage units 118 and 120. Nodes 102 and 104 are coupled to storage unit 118. Nodes 110 and 114 are coupled to storage unit 120. Storage units 118 and 120 include non-volatile storage for data from nodes 102, 106, 110 and 114.

Each node 102, 106, 110 and 116 has one or more domains. A domain is defined to be a process with its own address space. A domain can have multiple threads of execution, which can execute user or kernel application procedures. A kernel domain is associated with the operating system and a user domain is associated with a process other than the operating system. User domains typically execute one or more user application procedures. Each domain has one or more objects associated with it.

In one embodiment, the operating system is the Solaris MC operating system, which is a product of Sun Microsystems, Inc. of Palo Alto, Calif. The Solaris MC operating system is a UNIX-based operating system. Hence, in describing the present technology, UNIX terminology and concepts are frequently used. However, this usage is for purposes of illustration and is not to be construed as limiting the invention to this particular operating system.

Each thread can request the execution of an object (i.e., object's method). The location of the object is transparent to the thread. The object can reside in one of several locations. It can reside within the same domain as the requesting thread, in a different domain but within the same node as the requesting thread, or in the domain of a remote node.

A kernel domain has multiple threads that can execute kernel applications. Each kernel domain can have one or more kernel objects associated with it. A kernel object can be invoked by a thread within its domain or by a thread in a domain in another node.

The execution of a method for an object within the domain of the requesting application is treated as a local procedure call. The local procedure call is typically a function or subroutine call that transfers control from the application to the object's method, and eventually returns control to the application. The arguments associated with the object are passed through the local procedure call.

The execution of a method for an object that resides in a remote domain is treated as a remote procedure call. The remote procedure call is handled by the object request broker (ORB), which is a distributed mechanism for handling remote procedure calls. Thus, the ORB invokes methods for objects residing in different domains from the requesting application. These remote objects can be situated in the same node as the requesting application, or in a different node.

Description of Client-Server Interactions

Figure 2A:
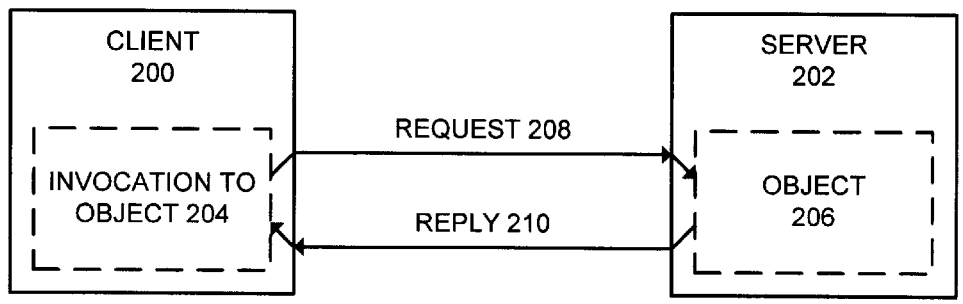
FIG. 2A illustrates prior art client-server interactions involved in an invocation to an object 206 in a non-highly available system.

FIG. 2A illustrates prior art client-server interactions involved in an invocation to an object 206 in a non-highly available system. In this embodiment, client 200 makes a reference to object 206 on server 202. Generally, this reference is in the form of an invocation of object 206.

In this embodiment, client 200 performs the invocation as follows. Client 200 makes an invocation 204 to object 206 on server 202. This generates a request 208 across network 100 to server 202. In response to request 208, server 202 calls a specified function on object 206. After this function call completes, server 202 returns a reply 210 across network 100 to client 200. The object invocation 204 is now complete.

Figure 2B:
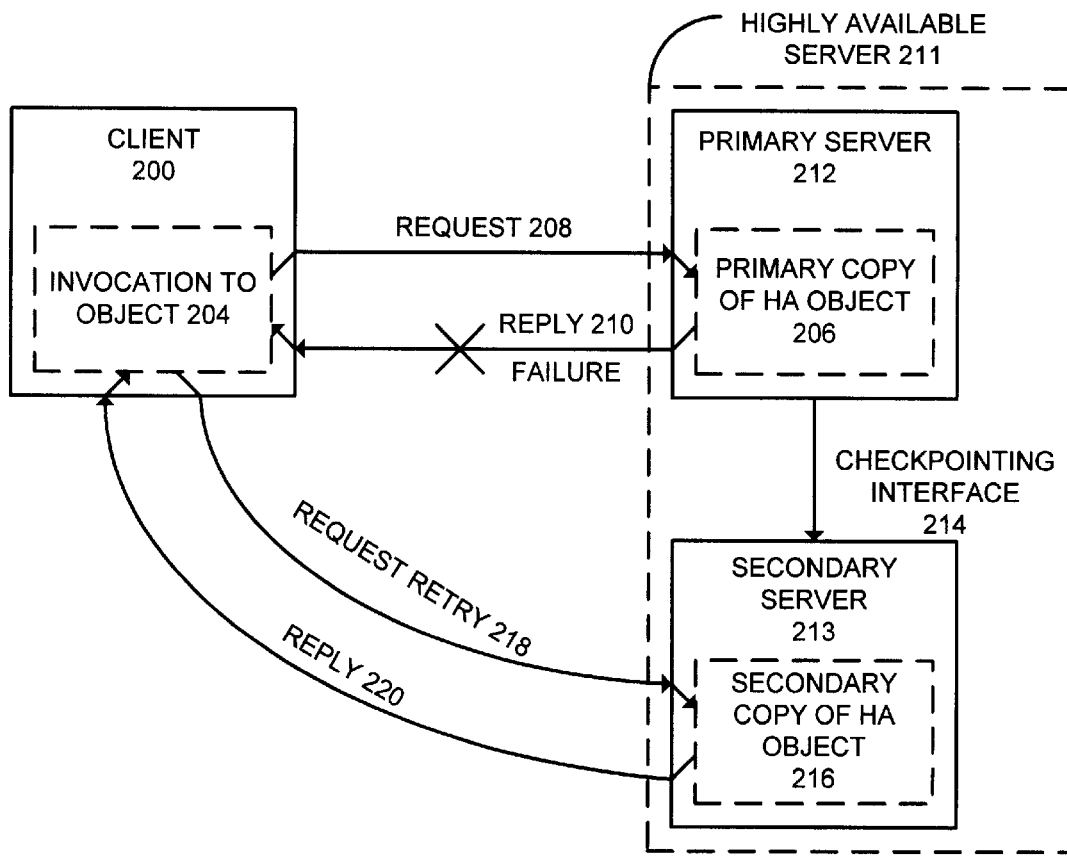
FIG. 2B illustrates client-server interactions involved in an invocation to a highly available object 206 on a highly available server 211 in accordance with an embodiment of the present invention.

FIG. 2B illustrates client-server interactions involved in an invocation to a highly available object 206 on a highly available server 211 in accordance with an embodiment of the present invention. Highly available server 211 includes a primary server 212 and a secondary server 213. Primary server 212 includes a primary copy of the highly available object, and secondary server 213 includes a secondary copy of the highly available object. Consistency is maintained between primary and secondary copies of the highly available object through communications across checkpointing interface 214.

The client-server interactions proceed in essentially the same way as in FIG. 2A, except that highly available server 211 continues to function even if primary server 212 becomes unresponsive or otherwise fails. First, client 200 makes an invocation 204 to the object. This causes a request 208 to be generated across network 100 to primary server 212. If primary server 212 for some reason becomes unresponsive, the reply 210 fails. This indicated by the cross on FIG. 2B.

When a failure occurs, the failure will eventually be detected by a system process called the replica manager 500, which is described in more detail with reference to FIG. 5 below. Replica manager 500 initiates a chain of events that cause software within client 200 to automatically retry the invocation to secondary server 213. This generates a retry request 218 to secondary server 213. In response to retry request 218, server 213 calls the specified function on the secondary copy of the object 216. After the function call completes, server 213 returns a reply 220 across network 100 to client 200. The object invocation 204 is now complete.

Description of System Layers

Figure 3:
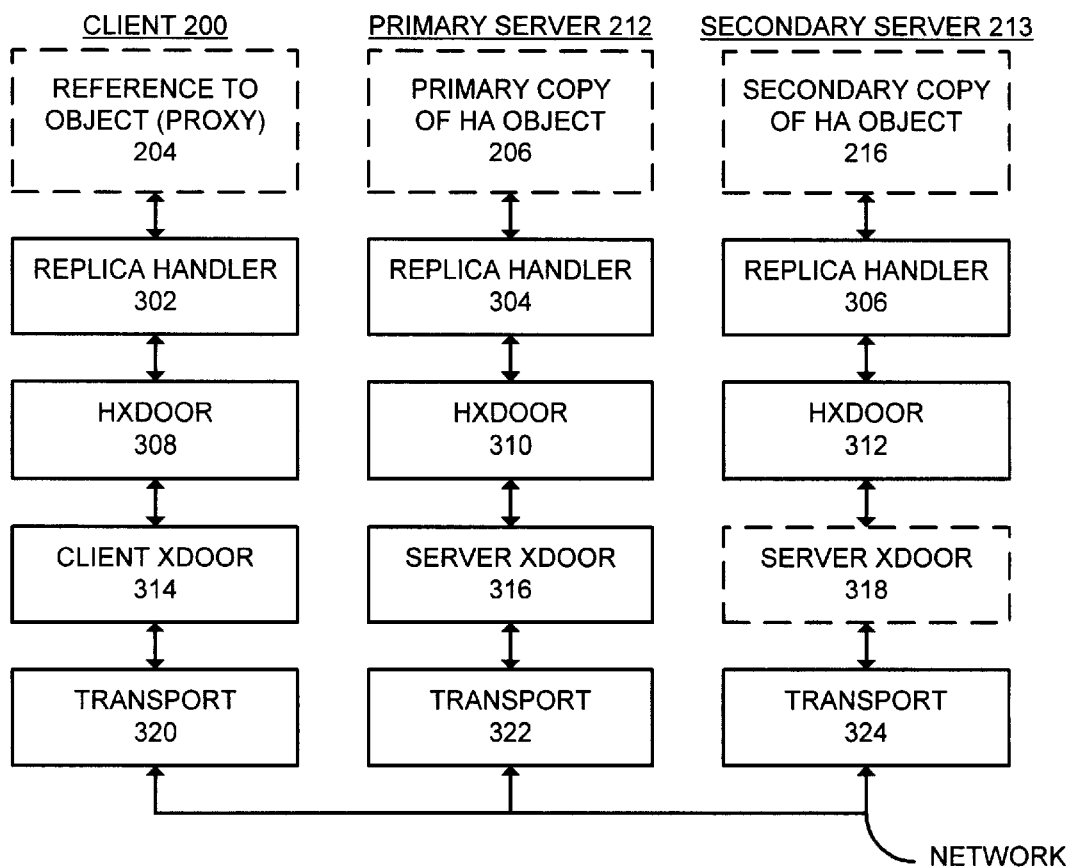
FIG. 3 illustrates various system layers involved in communications between client 200, primary server 212 and secondary server 213 in accordance with an embodiment of the present invention.

FIG. 3 illustrates various system layers involved in communications between client 200, primary server 212 and secondary server 213 in accordance with an embodiment of the present invention. On client system 200, invocation 204 to the object is handled by a proxy that forwards the reference to replica handler 302. A replica handler, such as replica handler 302, controls the basic mechanism of object invocation and argunent passing. A replica handler controls how an object invocation is implemented, how object references are transmitted between address spaces, how object references are released, and similar object runtime operations.

Replica handler 302 forwards the reference to hxdoor 308. In one embodiment, this reference passing is accomplished through a function call. Hxdoor 308 is an intermediate layer interposed between replica handler 302 and client xdoor 314. The data structures underlying hxdoor 308 are described in more detail below with reference to FIG. 4. Hxdoor 308 passes the reference to client xdoor 314.

Client xdoor 314 forwards the reference to transport mechanism 320, which forwards the reference in the form of a request across network 100 to transport mechanism 322 on primary server 212. Within primary server 212, this request propagates upwards in the reverse order through, server xdoor 316 and hxdoor 310 to replica handler 304. Finally, replica handler 304 applies the request to the primary copy of highly available object 206 so that the invocation is performed on highly available object 206. Next, a reply is sent back along to same path to client 200.

The state of a secondary copy 216 of the highly available object on secondary server 213 is then updated through checkpointing interface 214. This updating process is described in more detail in a related patent, entitled "Method and System for Achieving High Availability in Networked Computer Systems," by inventor(s), Matena, et al., having Ser. No. 08/829,156, which is referenced and incorporated by reference in the related application sections above. Note that secondary server 213 includes replica handler 306, hxdoor 312, server xdoor 318 and transport mechanism 324. In the illustrated embodiment, server xdoor 318 (which appears in dashed lines) is not created until a failover occurs. In this way, creation of server xdoor 318 is delayed until it is necessary.

Description of Data Structures

Figure 4:
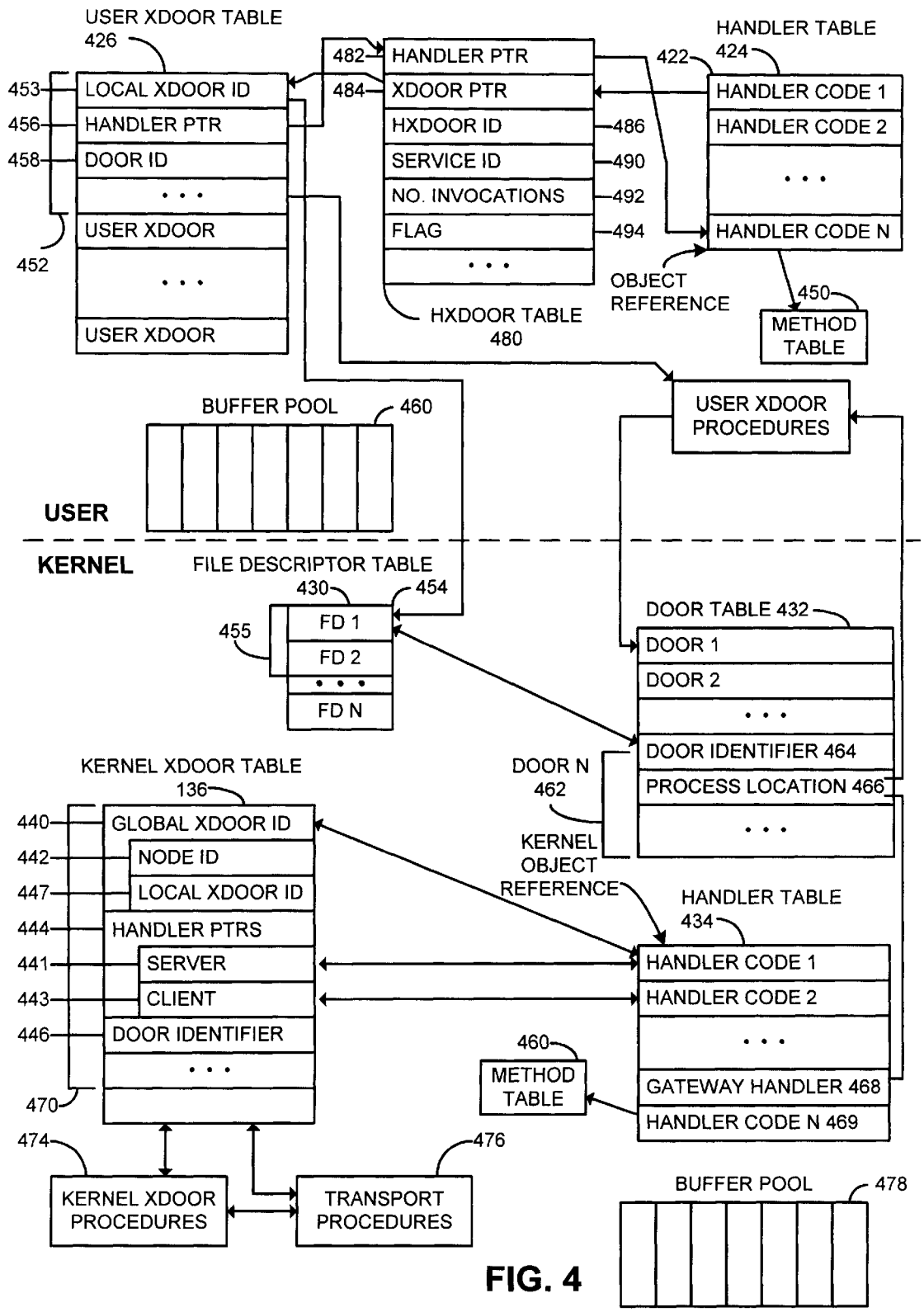
FIG. 4 illustrates some of the data structures involved in invocations to remote objects in accordance with an embodiment of the present invention.

FIG. 4 illustrates some of the data structures involved in invocations to remote objects in accordance with an embodiment of the present invention. Objects that are accessible by remote nodes have a xdoor 470 identified by a global xdoor identifier 440 that is used to uniquely identify the object within a particular node. In addition, each node is uniquely represented by a node identifier 442 that uniquely identifies the node within the distributed system. The global xdoor identifier 440 is coupled with the node identifier 442 to produce an identifier that uniquely identifies the object within the distributed system.

An application references an object utilizing a local xdoor identifier or file descriptor. In order to execute a remote object invocation, the ORB references the object using the servers file descriptor for that object. Thus, the ORB maps the client's object reference (i.e., local xdoor identifier) into the server's local xdoor identifier. This mapping is performed utilizing a number of procedures and data structures that reside in both the user and kernel domains.

The ORB utilizes several mechanisms to perform this mapping. The ORB includes the following procedures: handler procedures, xdoor procedures, and gateway handler procedures. The xdoor procedures reside in both the user and kernel domains. A brief description of these mechanisms is provided below with reference to FIG. 4.

An object is referenced by a handler procedure 422. Replica handlers 302, 304 and 406 are example of such a handler. Handler procedure 422 controls the basic mechanism of object invocation and argument passing. Handler procedure 422 controls how an object invocation is implemented, how object references are transmitted between address spaces, how object references are released, and similar object runtime operations. For local object invocations, handler 422 executes a local procedure call to the object's method 450.

Handler table 422 points to bxdoor table 480. Hxdoor table 480 is used by a correspond hxdoor. As mentioned above, an hxdoor is an intermediate layer between a replica handler and a xdoor that provides a level of indirection to facilitate high availability. To a replica handler, the hxdoor appears to be a xdoor. To a xdoor the hxdoor appears to be a replica handler.

Hxdoor table 480 includes an hxdoor ID 486, a service ID 490, a number of invocations 492 and a flag 494. The hxdoor ID identifies the particular hxdoor. The service ID 490 identifies a particular service, wherein a service is defined to be a group of objects. The number of invocations 492 keeps track of the number of uncompleted invocations currently outstanding to the service. Finally, the flag 494 indicates whether the hxdoor is on a client, a primary server or a secondary server.

For remote user object invocations, an object is represented in its domain by a user-level xdoor 452. A user-level xdoor 452 consists of a local xdoor identifier 453, a pointer to an appropriate handler 456, a door identifier 458, and other information. In one embodiment of the present invention, the local xdoor identifier 453 is a file descriptor. The door identifier 458 corresponds to a door representing the object and it is stored in the kernel-level door table 432.

A kernel-level xdoor 470 is a kernel state entity that is used to represent an object throughout the distributed system. The kernel-level xdoor 470 possibly includes a global xdoor identifier 440, handler pointers 444 (including a server handler pointer 441 and a client handler pointer 443), and a door identifier 446. Global xdoor identifier 440 is used to uniquely identify the object within the distributed system. It includes a node identifier 442 and a local xdoor identifier 447 for referring to a xdoor within a node. Door identifier 446 is used to identify the corresponding door 462.

There are two types of xdoors: a client xdoor and a server xdoor. Only client xdoors include a node identifier, such as node identifier 442, and only server xdoors include server handlers, such as the server hander pointed to by server handler pointer 441.

A door is a kernel state entity. It exists only for intra-node remote user objects (i.e., an intra-node remote user object is an object that resides in a different domain within the same node as the requesting domain). A door is represented by a file descriptor. Each user domain has a user xdoor table that stores the file descriptors of those objects accessible by threads associated with the domain. A user domain references a remote object through a file descriptor, located in the domain's user xdoor table, which is mapped into the actual door. Doors do not reside in the address space of the user accessible domains, but rather in the kernel domain.

The use of a file descriptor to represent a door provides a secure mechanism to control the objects that a user can invoke. A file descriptor is a protected kernel state and as such cannot be forged by a user. The possession of a file descriptor indicates that an application has permissible access to an object. The domain that generates the object becomes a server for the object and its door. The server exports object references to those applications that it wishes to have access to the object. In this manner, there is a secure mechanism to selectively control the applications that can access the objects within the distributed system.

An object can have a number of file descriptors associated with it. These file descriptors can reside in the same domain as the object, or alternatively, in different domains having access to the object. Each client domain that references a remote object has one or more file descriptors representing the object. In essence, the file descriptor is a local identifier for the object within a particular user domain.

A kernel object is represented in the kernel domain by a kernel-level xdoor 470. A kernel object's xdoor 470 contains an additional field that includes a local xdoor identifier 447 representing the kernel object in the kernel domain. Typically, the local xdoor identifier 447 is a file descriptor 454.

A kernel-level file descriptor table 430 is used to store each file descriptor 454 existing within a node 402. The file descriptor table 430 is partitioned into segments 455. Each segment represents the file descriptors 454 associated with a particular domain. Each file descriptor entry 454 references a door stored in a kernel-level door table 432. A door 462 includes a door identifier 464, a process location pointer 466, and other information. The process location pointer 466 reflects an entry point to a procedure in the server's address space that is used to perform the invocation. In the case of an intra-node remote user object invocation, process location pointer 466 is used to access the server's xdoor procedures 428. In the case of an inter-node remote object invocation or a remote kernel object invocation, process location pointer 466 is used to access a gateway handler 468 associated with the object. Gateway handler 468 is used to facilitate the transport of the remote object invocation request to the corresponding node. Gateway handler 468 translates object invocations utilizing file descriptors 454 to a respective system-wide identifier.

Description of Replica Manager

Figure 5:
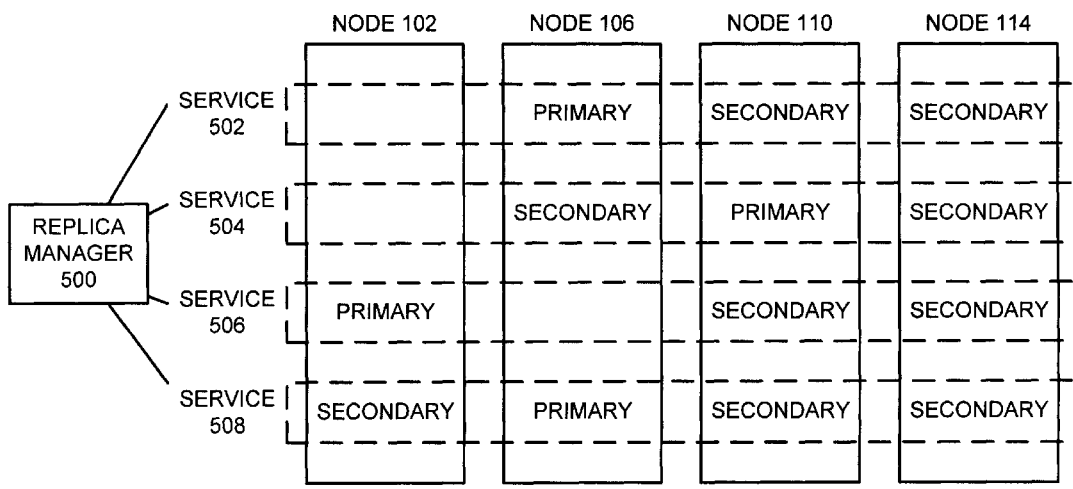
FIG. 5 illustrates how replica manager 500 keeps track of primary and secondary servers for various services in accordance with an embodiment of the present invention.

FIG. 5 illustrates how replica manager 500 keeps track of primary and secondary servers for various services in accordance with an embodiment of the present invention. For each service, replica manager 500 keeps a record of which nodes in a distributed system function as primary servers, and which nodes function as secondary servers. (Recall that a service is a related collection of objects.) For example, in FIG. 5 replica manager 500 keeps track of services 502, 504, 506 and 508. The primary server for service 502 is node 106, and the secondary servers are nodes 110 and 114. The primary server for service 504 is node 110, and the secondary servers are nodes 106 and 114. The primary server for service 506 is node 102, and the secondary servers are nodes 110 and 114. The primary server for service 508 is node 106, and the secondary servers are nodes 102, 110 and 114.

In one embodiment of the present invention, replica manager 500 is distributed across multiple nodes of the network, so that replica manager 500 will continue to function even if one of the nodes on the network fails.

Description of Operations

FIGS. 6–9 illustrate a number of operations involved in facilitating high availability in accordance with an embodiment of the present invention. These operations include, object creation, object invocation, and failover. Each of these is described in more detail with reference to FIGS. 6–9 below.

Description of Object Creation

Figure 6:
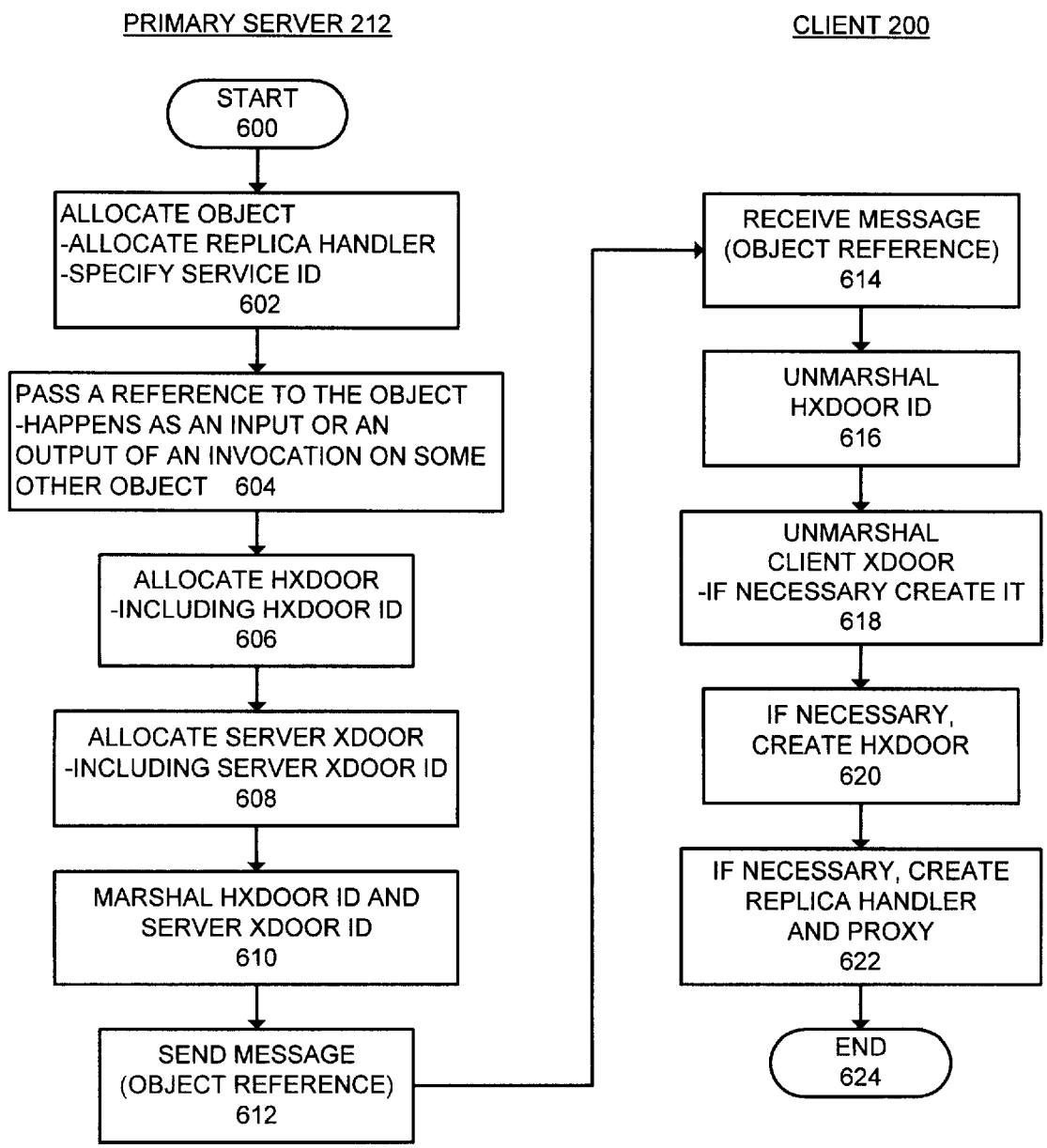
FIG. 6 is a flow chart illustrating some of the operations involved in creating an object in accordance with an embodiment of the present invention.

FIG. 6 is a flow chart illustrating some of the operations involved in creating an object in accordance with an embodiment of the present invention. This flow chart is divided into a left-hand column and a right-hand column. The left-hand column illustrates operations of primary server 212, and the right-hand column illustrates operations of client 200 (see FIG. 2B).

The system starts at state 600 and proceeds to state 602. In state 602, primary server 212 allocates the object. This entails allocating memory for data structures associated with the object. It also includes allocating a replica handler for the object, and specifying a service ID for the object. Recall that a service refers to a collection of related objects. Hence, a service ID is an identifier for a service. The system next proceeds to state 604. In state 604, the system passes a reference to the object. This can happen either as an input or an output of an invocation on some other object. The system next proceeds to state 606. In state 606, primary server 212 allocates an hxdoor, such as hxdoor 310 in FIG. 3. This hxdoor includes an hxdoor identifier (ID). The system next proceeds to state 608. In state 608, primary server 212 allocates a server xdoor, such as server xdoor 316 in FIG. 3. This server xdoor includes a server xdoor ID. The system next proceeds to state 610. Note that the preceding states, 606 and 608, are only executed the first time a reference is passed to the object. For subsequent references, the hxdoor 310 and server xdoor 316 structures already exist, and the system can simply skip over states 606 and 608. In state 610, primary server 212 marshals the hxdoor ID and the server xdoor ID, which entails packaging them into a message. The system next proceeds to state 612. In state 612, primary server 212 sends the message containing the object reference to client 200. The system next proceeds to state 614.

In state 614, client 200 receives the message containing the object reference. The system next proceeds to state 616. In state 616, client 200 unmarshals the hxdoor ID, which entails reading it from the message. The system next proceeds to state 618. In state 618, the system unmarshals the client xdoor, and if it is necessary, client 200 creates a new client xdoor, such as client xdoor 314 in FIG. 3. The system next proceeds to state 620. In state 620, if necessary, client 200 creates an hxdoor, such as hxdoor 308 in FIG. 3. The system next proceeds to state 622. In state 622, if they do not already exist, client 200 creates a replica handler, such as replica handler 203 in FIG. 3, and a proxy. The system next proceeds to state 614, which is an end state. At this point the object has been created, and data structures that facilitate invocations to the object have been created on both primary server 212 and client 200. In order to provide high availability, at least one secondary copy of the object must be created on a secondary server, such as secondary server 213 in FIG. 2B.

Figure 7:
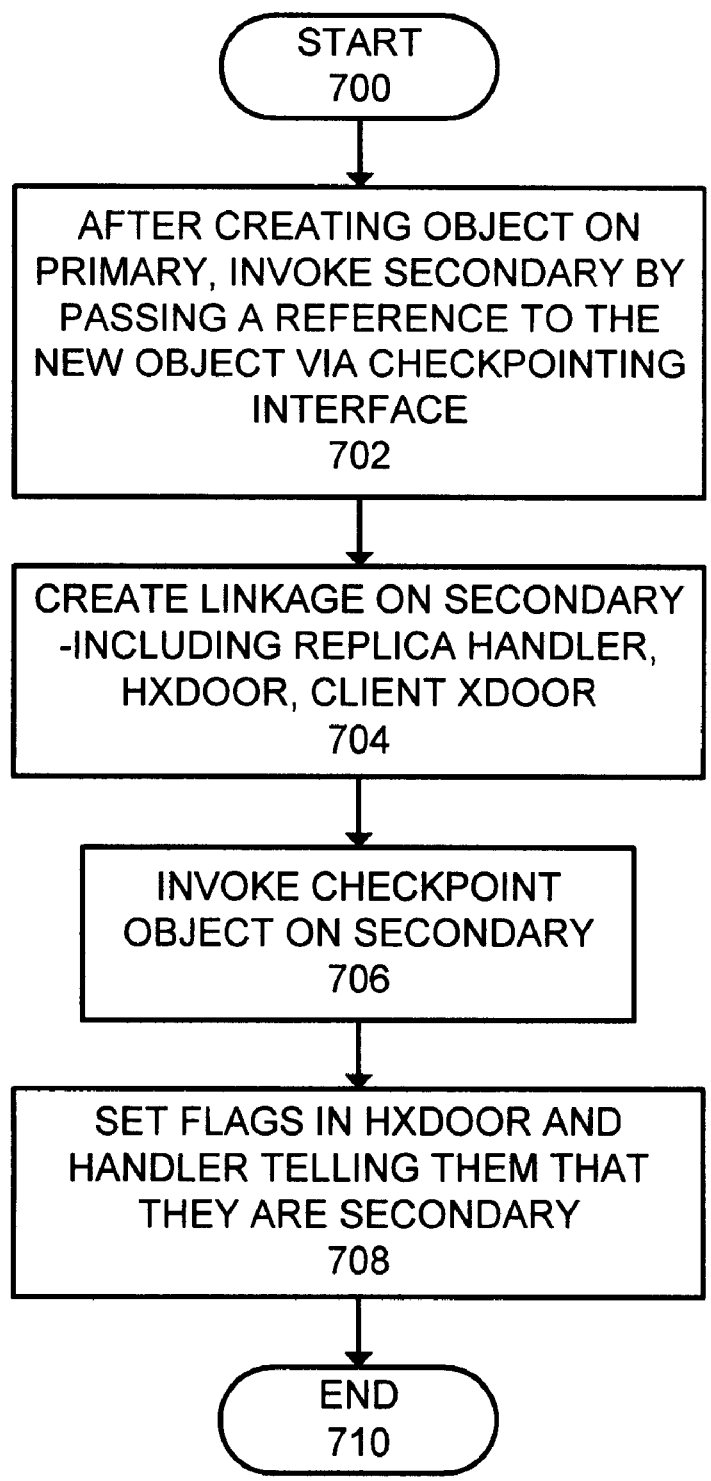
FIG. 7 is a flow chart illustrating some of the operations involved in creating an object on a secondary server in accordance with an embodiment of the present invention.

FIG. 7 is a flow chart illustrating some of the operations involved in creating an object on a secondary server in accordance with an embodiment of the present invention. The system starts at state 700 and proceeds to state 702. In state 702, at some time after primary server 212 allocates the object, primary server 212 initiates creation of the object on secondary server 213 by invoking the object on secondary server 213 (see FIG. 2B). This causes a reference to be passed from primary server 212 to secondary server 213 through checkpointing interface 214 (see FIG. 2B). The system next proceeds to state 704. In state 704, secondary server 213 creates a linkage for the object on secondary server 213. This linkage includes replica handler 306 and hxdoor 312 as is illustrated in FIG. 3. This linkage is created using the same process that is discussed above for creating analogous linkages for the object on client 200 with reference to FIG. 6, except that server xdoor 318 is not created initially, and will only be created when necessary during failover. The system next proceeds to state 706. In state 706, secondary server 213 invokes a checkpoint object within secondary server 213. This causes a secondary copy of the object to be allocated on secondary server 213. It also calls a function on hxdoor 312 and on replica handler 306 (from FIG. 3) informing them that they are associated with a secondary server for the object. The system next proceeds to state 708. In state 708, flags are set in hxdoor 312 and replica handler 306 to indicate that they are associated with the secondary copy of the object. The content of these flags are the only significant difference between the process for creating data structures on client 200, as is outlined in FIG. 6 above, and the process for creating data structures on secondary server 213. These flags allow the same mechanism to be used for both client data structure creation and secondary server data structure creation. When the invocation of the checkpoint object completes, the client xdoor is deleted on secondary server 213. As mentioned above, server xdoor 318 will not be created until necessary during failover. The system finally proceeds to state 710, which is an end state. The process of creating data structures on secondary server 213 is now complete. The process outlined in FIG. 7 may be repeated on other secondary servers to create additional secondary servers for the object, if such secondary servers are desired.

Note that this disclosure uses the terms "object" and "service" interchangeably. A service is defined to be a collection of related objects. Conceptually, a service is a generalization of an object, because if a service includes only one object, the service is essentially analogous to the object. In one embodiment, all of the above operations specified as being performed on an object are performed on a service.

Description of Object Invocation

Figure 8:
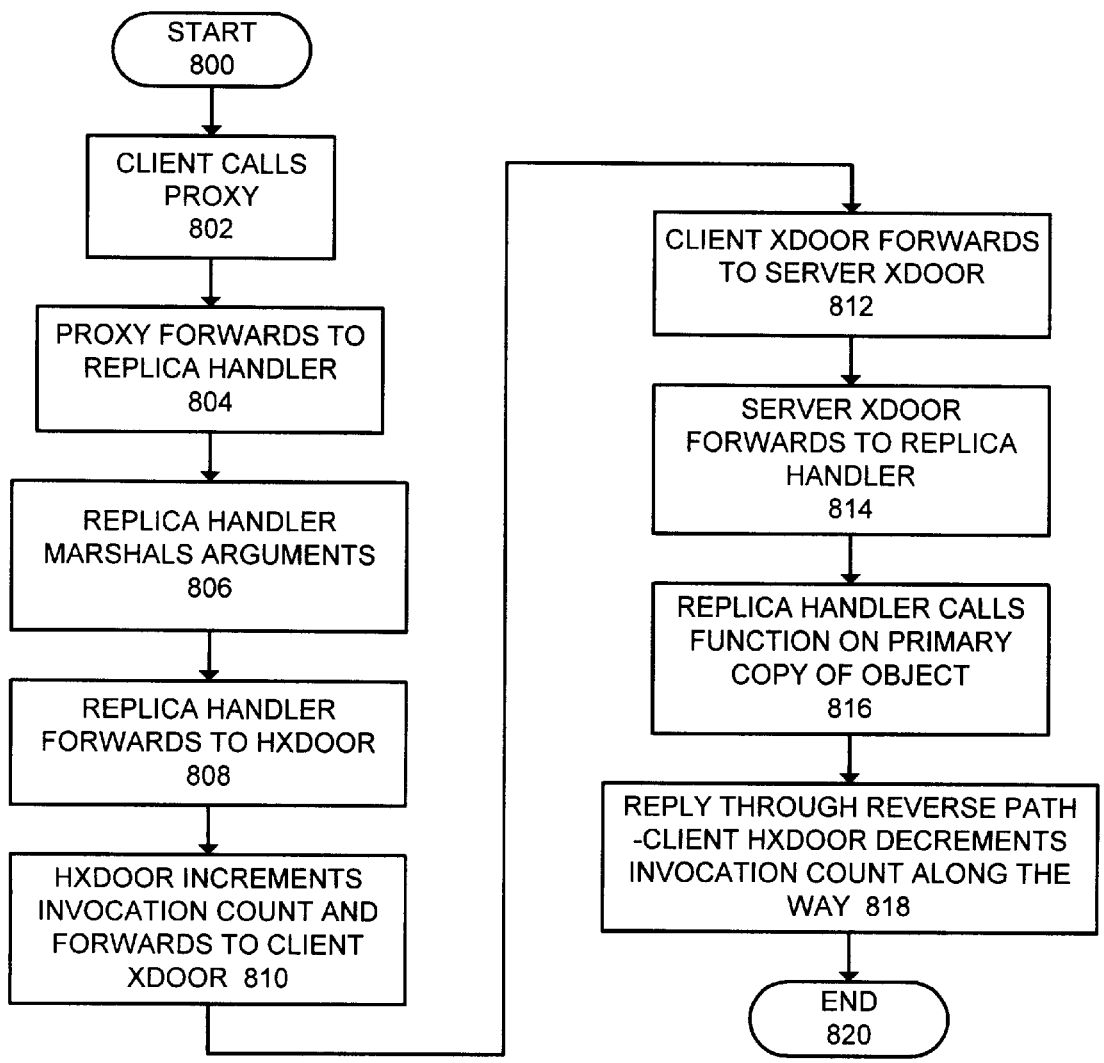
FIG. 8 is a flow chart illustrating some of the operations involved in invoking a highly available object in accordance with an embodiment of the present invention.

FIG. 8 is a flow chart illustrating some of the operations involved in invoking a highly available object in accordance with an embodiment of the present invention. The system starts at state 800 and proceeds to state 802. In state 802, client 200 calls its local proxy with an invocation to the object. The system then proceeds to state 804. In state 804, the proxy on client 200 forwards the invocation to replica handler 302 on client 200. Note that forwarding an invocation can be accomplished by performing a function call. The system next proceeds to state 806. In state 806, replica handler 302 marshals (gathers together) arguments pertaining to the invocation. The system next proceeds to state 808. In state 808, replica handler 302 forwards the invocation to hxdoor 308. The system next proceeds to state 810. In state 810, hxdoor 308 increments an invocation count related to the object to indicate that an additional invocation to the object is in progress. Hxdoor 308 then forwards the invocation to client xdoor 314. The system next proceeds to state 812.

In state 812, client xdoor 314 forwards the invocation to server xdoor 316 on primary server 212 (see FIG. 3). This is accomplished by forwarding the invocation through transport mechanism 320 on client 200, across network 100, and then through transport mechanism 322 on primary server 212, and then finally into server xdoor 316 (see FIG. 3). The system then proceeds to state 814.

In state 814, server xdoor 316 forwards the invocation to replica handler 304 on primary server 212. The system next proceeds to state 816. In state 816, replica handler 304 calls the specified function on the primary copy of the object 206 on primary server 212. The system then proceeds to state 818.

In state 818, primary server 212 sends a reply to the invocation back down the same pathway, but in the reverse direction. This reply is forwarded in essentially the same manner as the invocation. Along the way, hxdoor 308 decrements its invocation count for the object to indicate that the invocation is not longer in progress. The system next proceeds to state 820, which is an end state.

Description of Failover

Figure 9:
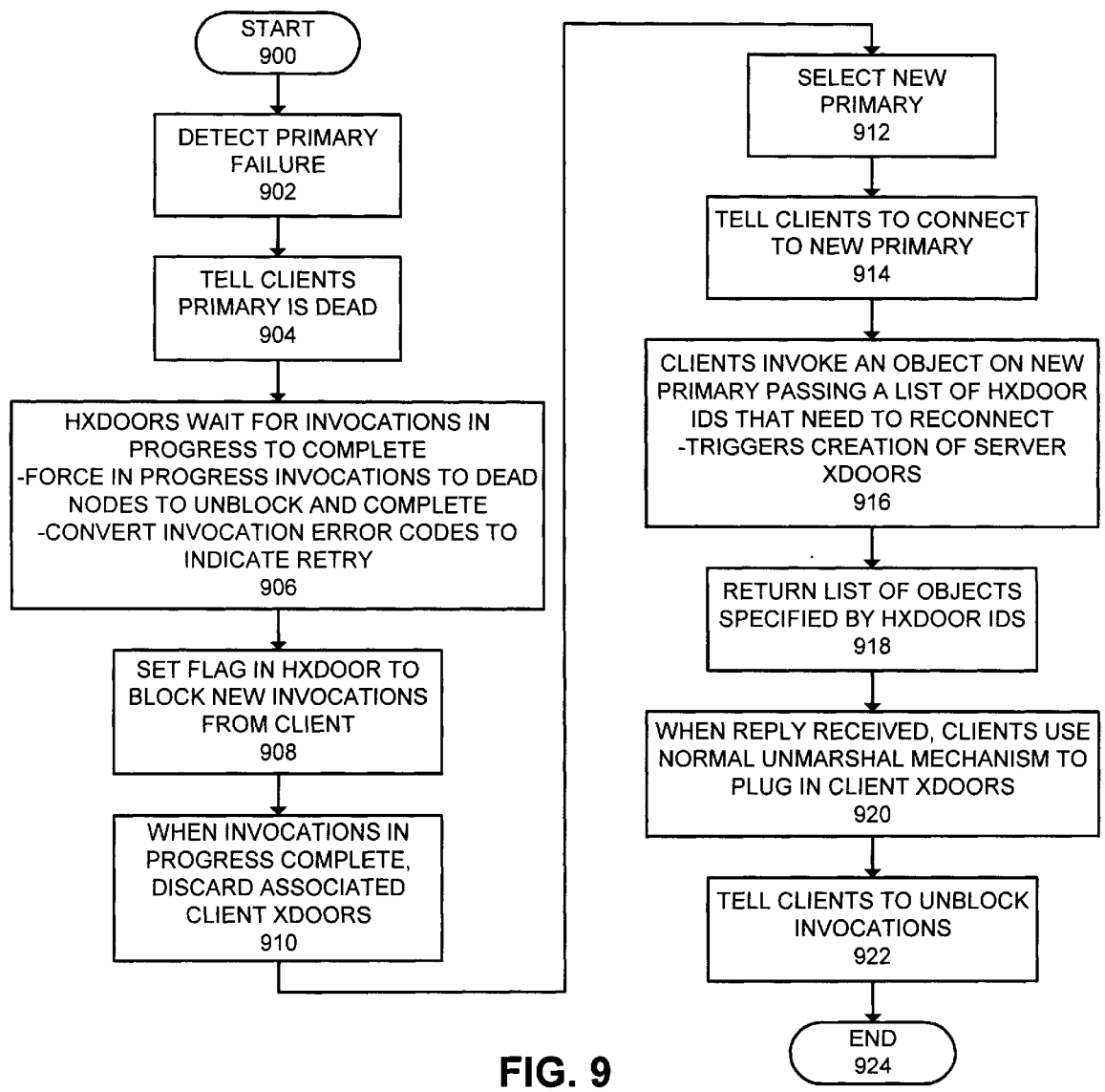
FIG. 9 is a flow chart illustrating some of the operations involved in performing a failover for an object from a primary to a secondary server in accordance with an embodiment of the present invention.

FIG. 9 is a flow chart illustrating some of the operations involved in performing a failover for an object from a primary server to a secondary server in accordance with an embodiment of the present invention. The system starts in state 900 and proceeds to state 902. In state 902, the system detects a failure of primary server 212 (see FIGS. 2 and 3). This failure can arise if primary server 212 ceases to function, or ceases to process client requests in a timely manner. In one embodiment of the present invention, this failure detection is performed by a replica manager, such as replica manager 500 described above with reference the FIG. 5. Next, the system proceeds to state 904. In state 904, replica manager 500 tells clients associated with primary server 212, that primary server 212 is no longer functioning properly. The system next proceeds to state 906.

In state 906, all hxdoors with in-progress invocations to primary server 212 wait for the in-progress invocations to complete. This includes forcing in-progress invocations to dead nodes to unblock and complete. When these in-progress invocations to dead nodes return, they typically return with an error code indicating the invocation did not complete. The hxdoors convert these error codes into another error code indicating the request should be retried by the proxy instead of returning an error to the client application program on client 200. In this way, the retry will take place automatically, and the client application program will not have to deal with any error conditions as a result of the failure of primary server 212. The system next proceeds to state 908.

In state 908, the hxdoors set a flag to indicate that new invocations to primary server 212 should be blocked until the failover is complete. This is done so that new invocations will not interfere with the failover process. The system then proceeds to state 910. In state 910, when the invocations to objects on primary server 212 complete, the associated client xdoors are discarded because they are configured for failed primary server 212. The system next proceeds to state 912.

In state 912, the system selects a secondary server to replace primary server 212. In one embodiment of the present invention, this secondary server is selected by replica manager 500 (see FIG. 5). The system next proceeds to state 914. In state 914, replica manager 500 tells all clients to connect to the new primary. The system then proceeds to state 916. In state 916, clients invoke the object on the new primary server. This includes passing a list of hxdoor identifiers that need to be reconnected to the new primary. Marshalling the reply triggers creation of server xdoors on the new primary server. The system then proceeds to state 918.

In state 918, a list of references to the objects specified by the hxdoor identifiers is returned to the clients. The system next proceeds to state 920. In state 920, when the reply is received, the clients use the normal unmarshalling mechanism to plug in the corresponding client xdoors. The system next proceeds to 922. In state 922, the system tells clients to unblock invocations to objects on failed primary server 212. This allows blocked invocations to proceed to the new primary server. The system then proceeds to state 914, which is an end state. At this point the failover is process is complete.

While the invention has been particularly shown and described with reference to embodiments thereof, those skilled in the art will understand that the foregoing and other changes in form and detail may be made therein without departing from the spirit and scope of the present invention.

What is claimed is:

1. A method for providing transparent failover from a first server to a second server for active invocations to an object, the first server acting as a primary server for invocations to the object, the method comprising:

winding up the active invocations to the object, including causing any active invocations to unresponsive nodes to unblock and complete;

selecting the second server as a new primary server for the object upon a failure of the first server;

reconfiguring the second server to act as the new primary server for the object;

automatically retrying the active invocations which are incomplete to the object on the second server;

wherein the object has a primary copy located within a first storage device associated with the first server, and a secondary copy located within a second storage device associated with the second server, wherein the first storage device is separate from the second storage device; and updating the secondary copy on the second server when the primary copy is updated on the first server.

2. The method of claim 1, wherein the operations of selecting the second server and reconfiguring the second server are performed automatically.

3. The method of claim 1, further comprising:

blocking any new active invocations to the object after the failure of the first server; and unblocking the new active invocations to the object after reconfiguring the second server.

4. The method of claim 1, further comprising detecting the failure of the first server.

5. The method of claim 4, wherein the operation of detecting the failure is carried out by a system manager that is distributed across at least two of, the first server, the second server and a plurality of additional computer systems, so that the system manager is tolerant of server failures.

6. The method of claim 1, further comprising notifying clients of the first server that the first server has failed.

7. The method of claim 1, wherein the object includes a group of objects.

8. A method for providing transparent failover from a first server to a second server for active invocations to an object, the first server acting as a primary server for invocations to the object, the method comprising:

detecting a failure of the first server;

blocking any new active invocations to the object after detecting the failure of the first server;

winding up the active invocations to the object, including causing any active invocations to unresponsive nodes to unblock and complete;

selecting the second server as a new primary server for the object;

reconfiguring the second server to act as the new primary server for the object;

unblocking the new active invocations to the object after reconfiguring the second server; and automatically retrying the active invocations which are incomplete to the object on the second server;

wherein the object has a primary copy located within a first storage device associated with the first server, and a secondary copy located within a second storage device associated with the second server, wherein the first storage device is separate from the second storage device; and updating the secondary copy on the second server when the primary copy is updated on the first server.

9. The method of claim 8, wherein the operation of detecting the failure is carried out by a system manager that is distributed across at least two of, the first server, the second server and a plurality of additional computer systems, so that the system manager is tolerant of server failures.

10. The method of claim 8, further comprising notifying clients of the first server that the first server has failed.

11. The method of claim 8, wherein the object includes a group of objects.

12. An apparatus that provides a transparent failover from a first server to a second server for active invocations to an object, the first server acting as a primary server for invocations to the object, the apparatus comprising:

the first server coupled to a network;

a first storage device associated with the first server;

the second server coupled to the network;

a second storage device associated with the second server;

a system manager residing on at least one node on the network, the system manager detecting a failure of the first server and selecting the second server to act as a new primary server for the object;

a reconfiguration mechanism in communication with the system manager that reconfigures the second server to act as the new primary server for the object;

a winding up mechanism that winds up active invocations to the object before reconfiguring the second server, including causing any active invocations to unresponsive nodes to unblock and complete;

a retry mechanism in communication with the second server that automatically retries the active invocations which are incomplete to the object to the second server after the second server has been reconfigured;

wherein the object has a primary copy located within the first storage device and a secondary copy located within the second storage device wherein the first storage device is separate from the second storage device; and an updating mechanism in communication with the first server and the second server that is configured to update the secondary copy on the second server when the primary copy is updated on the first server.

13. The apparatus of claim 12, wherein the system manager and the reconfiguration mechanism operate without requiring explicit retry commands from a client application program.

14. The apparatus of claim 12, further comprising a blocking mechanism that blocks new active invocations to the object when the failure of the first server is detected, and that unblocks the new active invocations to the object after the second server is reconfigured.

15. The apparatus of claim 12, wherein the object includes a group of objects.

16. The apparatus of claim 12, wherein the system manager is distributed across multiple nodes on the network so that the system manager is tolerant of node failures.

17. The apparatus of claim 12, wherein the system manager is configured to notify clients of the first server that the first server has failed.

18. The apparatus of claim 12, wherein the system manager includes a selection mechanism to select the second server to act as the new primary server for the object.

19. An apparatus that provides a transparent failover from a first server to a second server for active invocations to an object, the first server acting as a primary server for invocations to the object, the apparatus comprising:

the first server coupled to a network;

a first storage device associated with the first server;

the second server coupled to the network;

a second storage device associated with the second server;

a system manager residing on at least one node on the network that detects a failure of the first server and selects the second server to act as a primary server for the object;

a winding up mechanism that winds up active invocations to the object including causing any active invocations to unresponsive nodes to unblock and complete, before the second server is reconfigured to act as a new primary server for the object;

a blocking mechanism that blocks new invocations to the object when the failure of the first server is detected, and that unblocks new invocations to the object after the second server is reconfigured;

a reconfiguration mechanism in communication with the system manager that reconfigures the second server to act as the new primary server for the object;

a retry mechanism in communication with the second server that automatically retries uncompleted invocations to the object after the second server has been reconfigured;

wherein the object has a primary copy located within the first storage device and a secondary copy located within the second storage device, wherein the first storage device is separate from the second storage device; and an updating mechanism in communication with the first server and the second server that is configured to update the secondary copy on the second server when the primary copy is updated on the first server.

20. The apparatus of claim 19, wherein the system manager is distributed across multiple nodes on the network so that the system manager is tolerant to node failures.

21. The apparatus of claim 19, wherein the system manager is configured to notify clients of the first server that the first server has failed.

22. The apparatus of claim 19, wherein the system manager includes a selection mechanism to select the second server to act as a new primary server for the object.

23. The apparatus of claim 19, wherein the object includes a group of objects.

24. A program storage device storing instructions that when executed by a computer performs a method for providing transparent failover from a first server to a second server for active invocations to an object, the first server acting as a primary server for invocations to the object, the method comprising:

winding up the active invocations to the object, including causing any active invocations to unresponsive nodes to unblock and complete;

selecting the second server as a new primary server for the object upon a failure of the first server;

reconfiguring the second server to act as the new primary server for the object;

automatically retrying the active invocations which are incomplete to the object on the second server;

wherein the object has a primary copy located within a first storage device associated with the first server and a secondary copy located within a second storage device associated with the second server, wherein the first storage device is separate from the second storage device; and updating the secondary copy on the second server when the primary copy is updated on the first server.

25. A computer instruction signal embodied in a carrier wave carrying instructions that when executed by a computer perform a method for providing transparent failover from a first server to a second server for active invocations to an object, the first server acting as a primary server for invocations to the object, the method comprising:

winding up the active invocations to the object, including causing any active invocations to unresponsive nodes to unblock and complete;

selecting the second server as a new primary server for the object upon a failure of the first server;

reconfiguring the second server to act as the new primary server for the object;

automatically retrying the active invocations which are incomplete to the object on the second server;

wherein the object has a primary copy located within a first storage device associated with the first server, and a secondary copy located within a second storage device associated with the second server, wherein the first storage device is separate from the second storage device; and updating the secondary copy on the second server when the primary copy is updated on the first server.

* * * * *